Patented Apr. 13, 1948

2,439,514

UNITED STATES PATENT OFFICE 2,439,514

COMPOSITE STRUCTURES

Lee R. Herndon, Snyder, N. Y., assignor to E. I. du Pont de Nemours & Company, Wilmington, Del., a corporation of Delaware No Drawing. Application July 23, 1941,
Serial No. 403,765

22 Claims. (Cl. 154—136)

This invention relates to the treatment of certain yarns, filaments, cords, fabrics and the like to enable such fibrous structures to be more firmly bonded to vulcanized structures, such as structures composed of natural rubber, compounded rubber, synthetic rubber, rubber substitutes and the like. More particularly, the invention relates to new and improved methods of effecting a bond between certain types of reinforcing structures (yarns, filaments, cords, fabrics and the like) and vulcanized rubber structures, and the products resulting from such methods. The invention is applicable to yarns, cords, fabrics and the like composed of active hydrogen-containing material, for example, cellulosic filaments such as cotton fibers, regenerated cellulose filaments, substituted cellulose ester and ether filaments in which at least some of the hydroxyl groups of the cellulose are unsubstituted, wool fibers, and filaments composed of a synthetic linear superpolymer of the type disclosed in Carothers United States Patent No. 2,071,250.

The recently developed use of regenerated cellulose rayon, and similar artificial fibrous or filamentous structures, as reinforcing elements in vulcanized rubber structures, such as rubber tires, has presented troublesome problems of suitably bonding the above-said reinforcing elements to the rubber. The suitable bonding of filamentous structures to rubber involves a complex combination of strength of bond for long periods of time at high and low temperatures, differences in elasticity between the reinforcing elements and the rubber, constant flexing and bending of the tires, severe shocks and impacts to be absorbed by the tires, and other unusual conditions. The bonding problem has been solved to the extent that very satisfactory tires reinforced with artificial filamentous structures have been produced. The bonding problem has not, however, been solved to the satisfaction of the tire producing art, and much active work is still being carried on to secure improved results. Many of the adhesive and bonding agents now being used are applied to the artificial filamentous reinforcing elements from aqueous solutions. It has been found that aqueous solutions often impart non-uniformities of physical characteristics to the water-sensitive reinforcing elements such as regenerated cellulose structures, and reinforcing elements having non-uniform physical characteristics must be used in greater amounts than would otherwise be necessary to insure an adequate factor of safety.

As a result of this work on bonding of artificial filamentous reinforcing elements to rubber, the tire producing art has become cognizant of the improvements to be obtained by more securely bonding formerly used reinforcing elements, for example, cotton, to tires.

It is an object of this invention to provide a method of securing an improved bond between yarns, filaments, cords, fabrics and the like composed of the type of materials above described, and rubber, synthetic rubber or rubber substitutes.

It is a more specific object of this invention to provide a method for securing an improved bond between a cellulose yarn (i. e., cotton and regenerated cellulose yarn), or other structures comprising cellulose filaments, and rubber.

A still further object of the invention is to provide a method of securing an improved bond between structures comprising cellulose filaments, and rubber, characterized in that rubber may be more firmly anchored to the yarn or cord without the use of an aqueous bonding agent.

Other objects of the invention will appear hereinafter.

The objects of this invention are accomplished, in general, by applying to yarns, filaments, cords, fabrics or the like containing active hydrogens a modified rubber containing active hydrogens and a polyisocyanate, a polyisothiocyanate, or a mixed isocyanate-isothiocyanate, and bonding said resulting composite structure to rubber or the like by associating the same with unvulcanized rubber and vulcanizing the same. The presence of active hydrogens in the above-said materials may be determined by the Zerewitinoff or Kohler method. (Zerewitinoff, Ber., 40, 2033–1907; Ber. 41, 2236–1908. Kohler, J. Am. Chem. Soc., 49, 3181–1927.)

In order to exemplify more clearly and concisely the principles of the invention, it will be described with particular reference to fibrous reinforcing structures comprising regenerated cellulose filaments; however, as stated above, the invention is not limited to structures comprising regenerated cellulose filaments.

The term "rubber," unless otherwise modified, as used throughout the specification and claims, is intended to be used in its generic sense to include rubber substitutes, natural rubber, compounded rubber, modified rubber, synthetic rubber, and the like.

The following examples will serve to illustrate how improved bonds of cords to a rubber may be secured. It is to be understood, however, that the details set forth in the examples are not to be considered as limiting the scope of the invention. In the examples, parts and proportions are intended to be parts and proportions by weight unless otherwise indicated.

Example I

A solution containing 2% trioxane modified, active hydrogen-containing rubber, 33% hexamethylene diisocyanate, 65% toluene (solvent) was prepared by dissolving the active hydrogen-containing rubber in toluene at room temperature with mechanical stirring. When the solution was homogeneous after several hours of stirring, the hexamethylene diisocyanate was poured into the solution. The bath was then placed in a shallow tank of convenient width and length and an 1100-denier, high tenacity regenerated cellulose yarn, produced in accordance with the process disclosed in the U. S. patent to Parker, No. 2,133,714, was led through the bath by means of suitable guides, and then into a drying chamber maintained at 140° C. and provided with air circulation. The excess bath was permitted to drain back into the bath tank. The yarn did not come in contact with any support until it had traveled through the chamber a distance of approximately 5 feet wherein it was at least partially dried. Additional passes through the chamber were made by passing the yarn over suitable rollers. The yarn was drawn through the chamber mechanically at a speed of 15 feet per minute and wound on a bobbin. The increased weight of the yarn, resulting from the above treatment, amounted to 40% of the initial weight of the yarn. The yarn was then vulcanized to rubber and the strength of the bond of yarn to rubber tested in the following manner.

The yarn or cord, unless tested without being treated, is first treated by applying thereto an active hydrogen-containing rubber and a polyisocyanate, polyisothiocyanate or mixed isocyanate-isothiocyanate, for example, trioxane modified rubber and hexamethylene diisocyanate as in the above example. The treated cord is then laid on the surface of a skim coat of unvulcanized rubber calendered on to a cotton backing. The rubber and cord are then placed in a press and vulcanized at the temperature and pressure necessary to completely vulcanize the rubber. Shims are used which will allow the overflow of a very small amount of rubber during vulcanization. During the vulcanization, the cords become embedded in the surface of the rubber. The bond of the cords to the rubber is measured individually on a Scott tension testing machine. In this test, the cord is peeled from the rubber stock at a uniform rate and the bond strength read in terms of grams required to cause this separation.

As a basis of comparison, a bond strength value of 100 was assigned to an untreated regenerated cellulose cord, values higher than this indicating improved bond strength, and lower values indicating poorer bond strength. On this basis, untreated cotton cord of similar size and construction gave bond strength value of 150. The bond strength value of the yarn to rubber in Example I was 420 as compared with a value of 100 for a similar untreated yarn.

Example II

A solution having the composition 3% trioxane modified, active hydrogen-containing rubber, 5% hexamethylene diisocyanate, 92% toluene was made up and applied to the yarn in the same manner as described in Example I. The yarn was then vulcanized to rubber and tested for bond strength in the manner above described. The increase in weight of the yarn amounted to 15%, and the bond strength value was found to be 258.

Example III

A solution having the composition 5% trioxane modified, active hydrogen-containing rubber, 5% hexamethylene diisocyanate and 90% toluene was made up and applied to the yarn in a manner similar to that described in Example I. The increase in weight of the yarn was 8.6%. The yarn was then vulcanized to rubber and tested for bond strength in the manner above described. The bond strength value of the yarn to rubber was 700 as compared with 100 for a similar unmodified yarn.

Example IV

A solution having the composition 5% trioxane modified, active hydrogen-containing rubber, 5% hexamethylene diisocyanate, 90% toluene was prepared and applied to the yarn in the manner described in Example I. The increased weight of the yarn, as a result of the treatment, was 12.45% of the weight of the yarn. After being vulcanized to rubber and tested for bond strength as described above the bond strength value of this yarn to rubber was 876.

Example V

A solution having the composition 5% trioxane modified, active hydrogen-containing neoprene, 5% hexamethylene diisocyanate, 90% toluene was prepared and a high tenacity regenerated cellulose yarn was treated therein in the manner described in Example I. The treated yarn was then twisted mechanically and vulcanized to a neoprene base. The bond strength value of the treated yarn to neoprene was about 875 as compared with 100 for the untreated yarn. The increase in weight of the yarn was 17.1%.

Example VI

A solution having the composition 5% trioxane modified, active hydrogen-containing neoprene, 5% hexamethylene diisocyanate and 90% toluene was prepared and a high tenacity regenerated cellulose yarn treated therein. This treated yarn was then vulcanized to rubber and tested for bond strength. The bond strength value of the modified yarn to rubber was about 560 as compared with 100 for the untreated yarn. The increased weight of the yarn was 17%.

Example VII

A toluene solution containing 5% trioxane, modified active hydrogen-containing rubber and 5% hexamethylene diisocyanate was made up in accordance with the process described in Example I. This solution was coated on to a cotton tire reinforcing fabric. On removing the solvent from the coating by heat, it was found that the fabric had increased its weight 5.1%. The treated fabric was then vulcanized to rubber. It was found that the treated cotton fabric had a bond strength value to rubber of 249 in comparison to a value of untreated cotton to rubber of 150; i. e., the treated fabric gave a bond strength value of 66% better than the untreated fabric.

Example VIII

A cotton tire reinforcing fabric was coated with a sufficient quantity of the solution of Example VII to increase the weight of the fabric 8.7%. The treated fabric was then vulcanized to rubber. A bond strength value of 335 was obtained, which is an increase of 117% over a similar untreated fabric.

Example IX

A cotton tire reinforcing fabric was coated with a sufficient quantity of the solution of Example VII to increase the weight of the fabric 15.5%. The treated fabric was then vulcanized to rubber. A bond strength value of 417 was obtained which is an increase of 178% over the untreated cotton fabric.

Example X

A cotton tire reinforcing fabric was coated with a sufficient quantity of the solution of Example VII to increase the weight thereof 12.2%. The treated fabric was then vulcanized to neoprene synthetic rubber. A bond strength value of 338 was obtained which is an increase of 125% over the untreated fabric.

Example XI

Ninety plasticity pale crepe rubber was treated with paraformaldehyde in a Werner and Pfleiderer mixer for a period of one hour at a temperature of from 60° to 70° C. This material was then dissolved in toluene to form a solution containing 5% of the rubber compound and 5% hexamethylene diisocyanate. A rayon tire reinforcing fabric was treated with this solution until it had increased its weight 6.75%. The treated fabric, after vulcanization to rubber, was found to have an adhesion value of 750, which is 650% increase over the untreated rayon fabric.

Example XII

A solution having the composition 5% trioxane modified active hydrogen-containing rubber, 5% paraphenylene diisocyanate, and 90% toluene was prepared and a high tenacity regenerated cellulose yarn treated therein. This treated yarn was then vulcanized to rubber and tested for bond strength. The bond strength value of the modified yarn to rubber was about 825 as compared with 100 for the untreated yarn. The increased weight of the yarn was 9.75%.

Example XIII

A solution having the composition 5% trioxane modified active hydrogen-containing rubber, 5% para, para'-biphenylene diisocyanate, and 90% toluene was prepared and a high tenacity regenerated cellulose yarn treated therein. This treated yarn was then vulcanized to rubber and tested for bond strength. The bond strength value of the modified yarn to rubber was about 700 as compared with 100 for the untreated yarn. The increased weight of the yarn was 13%.

Example XIV

A solution having the composition 5% trioxane modified active hydrogen-containing rubber, 5% metaphenylene diisocyanate, and 90% toluene was prepared and a high tenacity regenerated cellulose yarn treated therein. This treated yarn was then vulcanized to rubber and tested for bond strength. The bond strength value of the modified yarn to rubber was about 675 as compared with 100 for the untreated yarn. The increased weight of the yarn was 15%.

The term "neoprene" is a generic term for synthetic rubber-like material made by polymerizing chloro-2 butadiene 1,3 in the presence or absence of modifiers.

In the processes such as described in the above examples, the active hydrogen-containing rubber may be used in a concentration ranging from 1% to 50%, but the preferred range lies between 1% and 10%. The hexamethylene diisocyanate, or other polyisocyanate or polyisothiocyanate, may vary in concentration from 0.5% to 60%, but the preferred range lies between 1% and 30%. The amount of material associated with the cellulosic material of the yarn will depend upon the concentration of the treating bath and the method used for its application to the yarn. In order to obtain optimum results, it has been found desirable to apply to the yarn a quantity of active hydrogen-containing rubber or rubber-like material which will noticeably increase the weight of the yarn. Although the quantity of active hydrogen-containing rubber and the above-said cyanate material applied to the yarn will vary, depending upon the article to be manufactured and the strength of bond desired, satisfactory results may be obtained when the increased weight, which measures the quantity of application, is from 0.25% to 75%.

Rubber materials containing active hydrogen, for example, the trioxane modified rubber and trioxane modified neoprene referred to in the examples are known in the art. Trioxane modified rubber may be prepared in the following manner:

A solution of 200 parts of 30 minute milled rubber and 100 parts of trioxane in 3830 parts of carbon tetrachloride is placed in a three-necked reactor fitted with a stirrer, reflux condenser, and thermometer extending into the solution. With agitation, the solution is heated to about 65° C. and a solution of 20 parts of anhydrous zinc chloride and 180 parts of acetic acid is added. With continuous agitation, the solution is heated at 65° C. for 4 hours; some thickening occurs in this time, but not sufficient to interfere with the stirring.

The reaction mixture is poured into a solution of 100 parts of ammonium chloride and 180 parts of 28% ammonium hydroxide in about 1000 parts of water and the layers well mixed with vigorous stirring. After separating, the product is again washed in the same manner and finally washed with water. The solvent is then removed by steam distillation and the rubber product freed of most of the remaining water by milling. As the material is sensitive to atmospheric oxidation, 1% of an antioxidant is milled in at this point.

The product thus obtained resembles the rubber from which it was derived in appearance, but is softer, more tacky, and more water sensitive.

There are other methods of preparing active hydrogen-containing rubber. It may be prepared in the solid state according to the following procedure. Fifty grams of 90 plasticity pale crepe, 25 grams of 1,3,5-trioxane, 5 grams of zinc chloride and 13 ccs. of glacial acetic acid were placed in a small Werner and Pfleiderer mixer and agitated for fifteen minutes in order to insure good mixing. The reaction mixture was then heated at 60° to 70° C. for period of one hour after which the contents of the mixer were cooled and placed on a rubber wash mill. After washing for fifteen minutes with water (25° to 30° C.), the rubbery mass was blown partially dry with air. Approximately 1% of phenyl alpha naphthyl amine was then added and the rubbery mass placed on a smooth roll mill and heated to remove the remaining water.

Active hydrogen-containing neoprene and other active hydrogen-containing rubber-like materials may be prepared in a similar manner to the preparation of active hydrogen-containing rubber.

A similar active hydrogen-containing rubber may be obtained using the above process but substituting paraformaldehyde for the 1,3,5-trioxane. The above procedure may be further changed by omitting the acetic acid. Similar products may also be prepared by the use of other aldehydes reactive with rubber.

Hydroxylated rubber, for example, the hydroxylated rubber prepared by reacting rubber with an aliphatic percarboxylic acid disclosed in United States Patent No. 1,988,448 is, of course, an active hydrogen-containing rubber and may be used in accordance with the present invention.

If desirable, rubber-curing agents may be incorporated in the active hydrogen-containing rubber which during the vulcanization step will cause the active hydrogen-containing rubber to be vulcanized. The proper curing agents may be selected dependent upon the degree of vulcanization desired.

It is possible that in the absence of curing agents in the active hydrogen-containing rubber some vulcanization of said active hydrogen-containing rubber may take place because of migration of the curing agents present in the rubber stock to the active hydrogen-containing rubber during vulcanization.

The yarns, cords, fabrics and the like may be treated in any suitable manner as by immersing in a suitable solvent solution of the ingredients and regulating the quantity of materials adhering to the cellulosic materials by means of squeeze rolls, scrapers, or other suitable devices, or by merely allowing the excess to drain off followed by solvent removal either spontaneously or at elevated temperature.

In certain instances, it may be preferable to apply separately the active hydrogen-containing rubber and the said cyanate compound to the yarn, cord or fabric structure. For example, the structure may first be treated with a solvent solution of the active hydrogen-containing rubber, dried to remove the solvent, and then the said cyanate compound applied thereto from solution or in vapor or gaseous form. Treatment of a yarn or cord structure with the said cyanate compound first and then with the active hydrogen-containing rubber is also a possibility and the order of application should in no way be considered as limiting the application of this invention.

The cord, or other filamentary structure, used in this invention may be composed of regenerated cellulose produced by the viscose process, regenerated cellulose produced by the cuprammonium process, or cellulose esters and ethers, including cellulose acetate, in which there are a substantial number of unsubstituted hydroxyl groups. The cord, or other filamentary structure, may be composed of a plurality of filaments, or it may be composed of a single large filament, such as a 1,000 or 1,500-denier regenerated cellulose filament, commonly referred to as a monofil. Cords made from cotton may also be bonded more securely to rubber by the present invention. Cords made from materials other than cellulose, for example, wool, may also be used, provided they contain active hydrogens, such as —OH, —NH$_2$, —NRH, —COOH, or —SH groups in the molecule, as determined by the above-said Zerewitinoff test. Cords made from synthetic linear polyamides such as disclosed in United States patent to Carothers No. 2,071,250 have been found to be suitable for use in accordance with the present invention. Obviously, if a yarn or cord is thermoplastic in nature, the temperature to which the material is subjected in the various steps of the process must be kept below that at which inferior results are obtained due to softening of the material.

The term "active hydrogen-containing rubber," as used throughout the specification and claims, is intended to cover active hydrogen-containing natural products produced from such materials as balata and gutta-percha, as well as active hydrogen-containing synthetic rubber-like materials produced from such materials as the polymers of isoprene, butadiene, and their homologues. The aforementioned active hydrogen-containing rubber and allied materials may be used singly or in combination with one another.

As examples of polyisocyanates, polyisothiocyanates and mixed isocyanate-isothiocyanate compounds, the following may be named: The diisocyanates and diisothiocyanates which combine readily with compounds containing active hydrogen. Other diisocyanates or diisothiocyanates than those specifically referred to in the examples are effective. Among those which may be used for purposes of the present invention in combination with active hydrogen-containing rubber may be mentioned hexamethylene diisocyanate, 1,4-cyclohexanediol diisocyanate, para-isocyanatobenzyl isocyanate, para-phenylene diisothiocyanate, 2,3-dimethyltetramethylene diisocyanate, p,p'-diphenylene diisothiocyanate, 2-chlorotrimethylene diisocyanate, 5-nitro-1,3-phenylene diisocyanate, metaisocyanatocinnamyl isocyanate, bis-2-isocyanatoethyl ether or its corresponding sulfide, and 1,5 diisocyanato-3-pentanone.

Others that are suitable include dodecamethylene diisocyanate, ethylene diisocyanate, methylene diisothiocyanate, ethylene diisothiocyanate, p-phenylene diisocyanate, p-phenylene diisothiocyanate, m-phenylene diisothiocyanate, 2,3-dimethyltetramethylene diisothiocyanate, 1,4-diisocyanatocyclohexane, 1,2,3,4-tetraisocyanatobutane, bis-2-isocyanatoethyl ether or the corresponding sulfide, p,p'-diphenylene diisocyanate, p,p'-diphenylene diisothiocyanate, 6-isocyanato-3-hexenyl isocyanate, and hexamethylene -1-isocyanate,-4-isothiocyanate.

Polymethylene diisocyanates and diisothiocyanates such as trimethylene diisocyanate, tetramethylene diisocyanate, pentamethylene diisocyanate, etc.; the corresponding diisothiocyanates; alkylene diisocyanates and diisothiocyanates such as propylene-1,2-diisocyanate, butylene-1,-2-diisocyanate, butylene-1,3-diisocyanate, butylene-2,3-diisocyanate, and butylene-1,3-diisothiocyanate; alkalidine diisocyanates and diisothiocyanates such as ethylene diisocyanate (CH$_2$CH(NCO)$_2$), butylidene diisocyanate (CH$_3$CH$_2$CH$_2$CH(NCO)$_2$), and heptylidene diisothiocyanate (CH$_3$(CH$_2$)$_5$CH(CNS)$_2$); cycloalkylene diisocyanates and diisothiocyanates such as cyclopentylene-1,3-diisocyanate, cyclohexylene-1,2-diisocyanate, cyclohexylene-1,4-diisocyanate, and cyclohexylene-1,2-diisothiocyanate; aromatic diisocyanates and diisothiocyanates such as m-phenylene diisocyanate, p-phenylene diisocyanate, 1-methyl-phenylene-2,4-diisocyanate, naphthylene-1,4-diisocyanate, 0,0'-toluene diisocyanate, diphenyl-4,4'-diisothiocyanate; aliphatic-aromatic diisocyanates or diisothiocyanates such as xylene-1,4-diisocyanate, xylene-1,-

3-diisocyanate, 4,4'diphenylene-methane diisocyanate, 4,4'-diphenylenepropane diisocyanate, or xylylene-1,4-diisothiocyanate, and diisocyanates and diisothiocyanates containing heteroatoms such as SCNCH₂OCH₂NCS,

SCNCH₂CH₂OCN₂CH₂NCS and SCN(CH₂)₃—S—(CH₂)₃NCS. In fact, any polyisocyanate, polyisothiocyanate, or mixed isocyanate-isothiocyanate of the general formula OCN—R—NCS in which R is a divalent organic radical will function for the above-said purposes of the present invention.

Although toluene has been used as the solvent for the active hydrogen-containing rubber, and for the above-said cyanate compound, it is to be understood that this invention is not limited thereto, and that any liquid which is non-reactive with the cyanate compound, and which is a common solvent for the two will be suitable. In a process in which the cyanate compound and the active hydrogen-containing rubber are applied in two different steps, it is not necessary to use the same solvent for both materials and further it is not necessary that the solvent be common to both materials.

If regenerated cellulose tire cord, treated with active hydrogen-containing rubber and one of the above-said cyanate compounds in the manner described, is placed upon a commercial compounded rubber stock, such as is customarily used in the manufacture of tires, and the whole is cured at high pressure and elevated temperature to vulcanize the rubber stock completely, the treated rayon is found to be strongly bonded to the rubber. If the treated rayon cord is subjected to a standard pull-out test at an elevated temperature, for example at 270° F., to measure the bond between the cord and rubber at this temperature, the bond is found to be at least equal to and often better than the bond of cotton cord to rubber at this temperature, a fact which is of the utmost importance in the construction of tires, fan belts and similar articles, which develop a high temperature under ordinary conditions of usage. Many of the previously known adhesives fail to provide a satisfactory bond at temperatures in this range.

The strong bond obtained between the fibrous rubber-reinforcing structure and the rubber, and the maintenance of the strength of such bond under the many varying conditions that rubber tires and similar structures are subject to, indicates that bond is chemical, rather than mechanical, in nature. Although not definitely established, it is believed that the above-said cyanate compound probably functions to chemically cross-link the active hydrogen-containing rubber to the active hydrogen-containing fibers or filaments and thereby securely bonding the said hydrogen-containing rubber to the fibers. The fibers so treated are then securely bonded to rubber by vulcanization of the rubber.

In addition to improving the bond of regenerated cellulose to rubber, the present invention greatly increases the durability to flexing and bending of a pad consisting of plies of cords treated in accordance with this invention to which a skim coat of compounded rubber stock has been applied and the whole subjected to sufficient pressure and temperature to completely vulcanize the rubber. The pad may be flexed and bent under tension many times before separation of the plies takes place. For example, where such a pad prepared from untreated regenerated cellulose cord may be flexed 2,000 times and a similar pad prepared from untreated cotton may be flexed 17,000 times before separation of the plies takes place, a similar pad prepared from regenerated cellulose cord treated in accordance with this invention may be flexed 23,000 times before separation of the plies takes place.

Moreover, regenerated cellulose cords treated according to this invention and combined with rubber show good resistance to known fatigue tests.

Fatigue resistance of tire cord may be measured in a variety of ways, for example, the cord may be subjected for a fixed number of flexings to drastic conditions of flexing and simultaneous stretching at an elevated temperature, conditions which are designed to approximate those encountered during the actual use of tires. The tensile strength of the cord after the prescribed flexing or bending and stretching, compared with the tensile strength before the test, gives one measure of the fatigue resistance of the cord. For regenerated cellulose cord, treated according to this invention, the drop in tensile strength after such a fatigue resistance test is very slight, whereas the loss of tensile strength of cotton cord under the same conditions is very substantial. Obviously, this improved resistance to fatigue exhibited by regenerated cellulose cord treated according to this invention is a great advantage in cord designed for use in tires, fan belts, and the like, which undergo constant and severe flexing, bending and stretching when in operation.

In addition to the foregoing advantages, the treatment of regenerated cellulose cord or fabric according to the present invention does not discolor the cord nor does it excessively stiffen or harden the cord or fabric. The yarns are smooth and non-tacky. The yarn does not have the appearance of one having an adhesive on its surface. The yarn exhibits no peeling or cracking as is often the case with previously known tire cord adhesives. The process of treating the yarn contrary to the processes of the prior art is performed in the absence of water. Since water swells the regenerated cellulose cord, it may somewhat affect the properties thereof, which may be detrimental to the use of this cord in automobile tires. Other advantages accrue from the ease with which the treatment may be applied to regenerated cellulose cords, or fabrics, making unnecessary any changes in the equipment in current commercial processes for the treatment of fabrics or individual cords, and the cheapness and ready availability of these raw materials.

A further advantage of the increased bond strength as obtained by the present invention is that the tire will be stronger and will resist cord separation if the tire is run flat for short distances. With a suitable rim design, it is believed that damage to the tire in case of puncture or blowout will be minimized.

The process of this invention is further useful in the adhesion of fabrics to rubber, for example, in the manufacture of tennis shoes. The fact that the fabric is not discolored by the process is particularly advantageous.

Since it is obvious that many changes and modifications can be made in the above-described details without departing from the nature and spirit of the invention, it is to be understood that the invention is not to be limited to the details described herein except as set forth in the appended claims.

I claim:

1. The process of manufacturing reinforced rubber articles such as rubber tires and the like which comprises applying to an active hydrogen-containing fibrous reinforcing structure an active hydrogen-containing rubber and a cyanate taken from the group consisting of polyisocyanates, polyisothiocyanates, and mixed isocyanate-isothiocyanate compounds, associating the resulting structure with vulcanizable rubber, and subjecting the mass to a vulcanizing temperature.

2. The process of manufacturing reinforced rubber articles such as rubber tires and the like which comprises applying to a fibrous regenerated cellulose reinforcing structure an active hydrogen-containing rubber and a cyanate taken from the group consisting of polyisocyanates, polyisothiocyanates, and mixed isocyanate-isothiocyanate compounds, associating the resulting structure with vulcanizable rubber, and subjecting the mass to a vulcanizing temperature.

3. The process of manufacturing reinforced rubber articles such as rubber tires and the like which comprises applying to an active hydrogen-containing fibrous reinforcing structure an active hydrogen-containing natural rubber and a cyanate taken from the group consisting of polyisocyanates, polyisothiocyanates, and mixed isocyanate-isothiocyanate compounds, associating the resulting structure with vulcanizable rubber, and subjecting the mass to a vulcanizing temperature.

4. The process of manufacturing reinforced rubber articles such as rubber tires and the like which comprises applying to a fibrous regenerated cellulose reinforcing structure an active hydrogen-containing natural rubber and a cyanate taken from the group consisting of polyisocyanates, polyisothiocyanates, and mixed isocyanate-isothiocyanate compounds, associating the resulting structure with vulcanizable rubber, and subjecting the mass to a vulcanizing temperature.

5. The process of manufacturing reinforced rubber articles such as rubber tires and the like which comprises applying to an active hydrogen-containing fibrous reinforcing structure an active hydrogen-containing rubber and a diisocyanate, associating the resulting structure with vulcanizable rubber, and subjecting the mass to a vulcanizing temperature.

6. The process of manufacturing reinforced rubber articles such as rubber tires and the like which comprises applying to an active hydrogen-containing fibrous reinforcing structure an active hydrogen-containing rubber and a diisothiocyanate, associating the resulting structure with vulcanizable rubber, and subjecting the mass to a vulcanizing temperature.

7. The process of manufacturing reinforced rubber articles such as rubber tires and the like which comprises applying to a fibrous regenerated cellulose reinforcing structure an active hydrogen-containing rubber and a diisocyanate, associating the resulting structure with vulcanizable rubber, and subjecting the mass to a vulcanizing temperature.

8. Vulcanized rubber articles such as rubber tires and the like, reinforced with an active hydrogen-containing fibrous reinforcing structure, said fibrous reinforcing structure bonded to a vulcanized rubber by means of an active hydrogen-containing rubber and a cyanate taken from the group consisting of polyisocyanates, polyisothiocyanates, and isocyanate-isothiocyanate compounds.

9. Vulcanized rubber articles such as rubber tires and the like, reinforced with a fibrous regenerated cellulose reinforcing structure, said regenerated cellulose reinforcing structure bonded to a vulcanized rubber by means of an active hydrogen-containing rubber and a cyanate taken from the group consisting of polyisocyanates, polyisothiocyanates, and isocyanate-isothiocyanate compounds.

10. Vulcanized rubber articles such as rubber tires and the like, reinforced with an active hydrogen-containing fibrous reinforcing structure, said fibrous reinforcing structure bonded to a vulcanized rubber by means of an active hydrogen-containing natural rubber and a cyanate taken from the group consisting of polyisocyanates, polyisothiocyanates, and isocyanate-isothiocyanate compounds.

11. Vulcanized rubber articles such as rubber tires and the like, reinforced with a fibrous regenerated cellulose reinforcing structure, said regenerated cellulose reinforcing structure bonded to a vulcanized rubber by means of an active hydrogen-containing natural rubber and a cyanate taken from the group consisting of polyisocyanates, polyisothiocyanates, and isocyanate-isothiocyanate compounds.

12. Vulcanized rubber articles such as rubber tires and the like, reinforced with an active hydrogen-containing fibrous reinforcing structure, said fibrous reinforcing structure bonded to a vulcanized rubber by means of an active hydrogen-containing rubber and a diisocyanate.

13. Vulcanized rubber articles such as rubber tires and the like, reinforced with an active hydrogen-containing fibrous reinforcing structure, said fibrous reinforcing structure bonded to a vulcanized rubber by means of an active hydrogen-containing rubber and a diisothiocyanate.

14. Vulcanized rubber articles such as rubber tires and the like, reinforced with a fibrous regenerated cellulose reinforcing structure, said regenerated cellulose reinforcing structure bonded to a vulcanized rubber by means of an active hydrogen-containing rubber and a diisocyanate.

15. The process of manufacturing reinforced rubber articles such as rubber tires and the like which comprises applying to a fibrous regenerated cellulose reinforcing structure an active hydrogen-containing rubber and hexamethylene diisocyanate, associating the resulting structure to vulcanizable rubber, and subjecting the mass to a vulcanizing temperature.

16. The process of manufacturing reinforced rubber articles such as rubber tires and the like which comprises applying to a fibrous cotton reinforcing structure an active hydrogen-containing rubber and a cyanate taken from the group consisting of polyisocyanates, polyisothiocyanates, and isocyanate-isothiocyanate compounds, associating the resulting structure to vulcanizable rubber, and subjecting the mass to a vulcanizing temperature.

17. Vulcanized rubber articles such as rubber tires and the like, reinforced with a fibrous regenerated cellulose reinforcing structure, said fibrous structure bonded to a vulcanized rubber by means of an active hydrogen-containing rubber and hexamethylene diisocyanate.

18. Vulcanized rubber articles such as rubber tires and the like, reinforced with a fibrous cotton reinforcing structure, said fibrous structure bonded to a vulcanized rubber by means of an active hydrogen-containing rubber and a cyanate taken from the group consisting of polyisocyanates, polyisothiocyanates, and isocyanate-isothiocyanate compounds.

19. The process of producing fibrous reinforcing structures for reinforced rubber articles such as rubber tires and the like which comprises applying to an active hydrogen-containing fibrous reinforcing structure an active hydrogen-containing rubber and a cyanate taken from the group consisting of polyisocyanates, polyisothiocyanates and mixed isocyanate-isothiocyanate compounds.

20. The process of producing fibrous reinforcing structures for reinforced rubber articles such as rubber tires and the like which comprises applying to a fibrous regenerated cellulose reinforcing structure an active hydrogen-containing rubber and a cyanate taken from the group consisting of polyisocyanates, polyisothiocyanates and mixed isocyanate-isothiocyanate compounds.

21. An active hydrogen-containing fibrous reinforcing structure for rubber articles such as rubber tires and the like, said fibrous reinforcing structure bonded to an active hydrogen-containing rubber by means of a cyanate taken from the group consisting of polyisocyanates, polyisothiocyanates, and mixed isocyanate-isothiocyanate compounds.

22. A fibrous regenerated cellulose reinforcing structure for rubber articles such as rubber tires and the like, said reinforcing structure bonded to an active hydrogen-containing rubber by means of a cyanate taken from the group consisting of polyisocyanates, polyisothiocyanates, and mixed isocyanate-isothiocyanate compounds.

LEE R. HERNDON.

REFERENCES CITED

The following references are of record in the file of this patent:

UNITED STATES PATENTS

| Number | Name | Date |
|---|---|---|
| 1,640,363 | McGavack | Aug. 30, 1927 |
| 1,839,950 | Cadwell | Jan. 5, 1932 |
| 2,011,726 | Muller | Aug. 20, 1936 |
| 2,080,730 | McCortney | May 18, 1937 |
| 2,188,283 | Manchester | Jan 29, 1940 |
| 2,128,635 | Charch et al. | Aug. 30, 1938 |
| 2,277,083 | Dorough | Mar. 24, 1942 |
| 2,313,945 | Kellog et al. | Mar. 16, 1943 |

FOREIGN PATENTS

| Number | Country | Date |
|---|---|---|
| 486,878 | Great Britain | June 10, 1938 |